United States Patent Office 3,275,650
Patented Sept. 27, 1966

3,275,650
7 - NITROSO-7,14-DIAZADISPIRO - [5.1.5.2] - PENTA-
DECANE-15-THIONE AND LOWER ALKYL DE-
RIVATIVES THEREOF
Wendell S. Cook, Fulton, Ohio, assignor to The Firestone
Tire & Rubber Company, Akron, Ohio, a corporation
of Ohio
No Drawing. Filed Aug. 11, 1964, Ser. No. 388,943
2 Claims. (Cl. 260—309.7)

This application is a continuation-in-part of Oberster and Cook Serial No. 163,896 filed January 2, 1962, now U.S. Patent 3,205,194.

This invention relates to 7-nitroso derivatives of imidazolidine thiones and their use as stabilizers for polymers and their vulcanizates. It includes the stabilized polymers and vulcanizates.

Various derivatives of imidazolidine - 4 - thiones are known in the literature.

The 7-nitroso derivatives of 7,14-diazadispiro-[5.1.5.2]-pentadecane-15-thione and lower alkyl derivatives thereof substituted on methylene groups which are connected to two other methylene groups are stabilizers of diene elastomer emulsion polymers (for example, BR, SBR, NBR, ABR and IR) and their vulcanizates. Such alkyl derivatives are prepared from lower alkyl derivatives of the parent compound, by the procedure set forth in Example 1. The polymers and their vulcanizates are prepared in any usual manner, and the stabilizer is added at a convenient stage, preferably just prior to coagulation of the polymer or polymers.

The stabilizers of this invention include the 7-nitroso derivatives of the following which are illustrative:

3,11-dimethyl-7,14-diazadispiro-[5.1.5.2]-pentadecane-15-thione
3,11-di-t-butyl-7,14-diazadispiro-[5.1.5.2]-pentadecane-15-thione
3,11-di-t-amyl-7,14-diazadispiro-[5.1.5.2]-pentadecane-15-thione
3,11-di-n-butyl-7,14-diazadispiro-[5.1.5.2]-pentadecane-15-thione
2,10-dimethyl-7,14-diazadispiro-[5.1.5.2]-pentadecane-15-thione
2,10-di-n-butyl-7,14-diazadispiro-[5.1.5.2]-pentadecane-15-thione
2,10-di-t-octyl-7,14-diazadispiro-[5.1.5.2]-pentadecane-15-thione
3,11-dicyclohexyl-7,14-diazadispiro-[5.1.5.2]-pentadecane-15-thione
3,11-diisopropyl-7,14-diazadispiro-[5.1.5.2]-pentadecane-15-thione
2,10-diethyl-7,14-diazadispiro-[5.1.5.2]-pentadecane-15-thione
2,4,10,12-tetramethyl-7,14-diazadispiro-[5.1.5.2]-pentadecane-15-thione
2,3,10,11-tetraethyl-17,14-diazadispiro-[5.1.5.2]-pentadecane-15-thione The following examples illustrate more particularly the preparation of 7- and 14-nitroso-7,14-diazadispiro-[5.1.5.2]-pentadecane-15-thiones and their use in SBR. The 7-nitroso derivative can be used as a stabilizer in SBR and the other polymer rubbers referred to herein and their vulcanizates. The 7-nitroso derivatives of the lower alkyl derivatives to which reference has been made are useful as stabilizers in all of these polymers and vulcanizates. The 14-nitroso derivatives are not suitable for use as stabilizers. The 7-nitroso derivatives are non-staining and polymers containing them age with substantially no discoloration.

The parent compound, 7,14-diazadispiro-[5.1.5.2]-pentadecane-15-thione has the following formula:

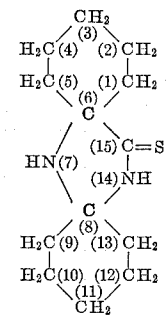

The following examples illustrate the preparation of the 7- and 14-nitroso derivatives:

*Example 1.—7-nitroso derivative of 7,14-diazadispiro-[5.1.5.2]-pentadecane-15-thione*

A solution of 23.8 grams of the parent compound in 1000 ml. of glacial acetic acid was prepared by heating the mixture to about 60° C. The solution was cooled to room temperature and filtered to remove a slight amount of insoluble material. The solution was then stirred slowly and 9.6 grams of sodium nitrite was added over a period of about one hour. At the end of the addition, a thick crystal mass had formed in the flask. The product was collected on a filter and washed with cold water. The product was air dried. It weighed 24.3 grams and melted at 208–211° C.

*Analysis.*—Calc'd for $C_{13}H_{21}N_3SO$: C—58.40; H—7.92; S—11.99. Found: C—58.93; H—7.82; S—11.96.

*Example 2.—14-nitroso derivative of 7,14-diazadispiro-[5.1.5.2]-pentadecane-15-thione*

A solution of 11.9 grams of the parent compound in 500 ml. of glacial acetic acid was prepared by heating the mixture to about 60° C. To this warm solution was added 13 ml. of concentrated hydrochloric acid. Some material precipitated out at this point. Seven grams of sodium nitrite was added in small portions over a one hour period. The reaction mixture was then left at room temperature for several hours with occasional stirring. The reaction mixture was filtered and the product air dried. Eleven and one-half grams of product was obtained and melted with vigorous decomposition at 206–210° C. A mixed melting point with the product obtained in Example 1 (M.P. 208–211° C.) resulted in a lowering of the melting point to 197–214° C.

*Analysis.*—Calc'd for $C_{13}H_{21}N_3SO$: C—58.40; H—7.92; S—11.99. Found: C—58.97; H—7.92; S—11.94.

The position of the nitroso group in the isomeric compounds described in Examples 1 and 2 above was established using nuclear magnetic resonance spectral data.

In the following tables comparison has been made with a widely used commercial stabilizer for SBR polymer which is identified as Stabilizer I, and 7- and 14-nitroso derivatives of the parent compound were tested and compared with the parent compound, these latter stabilizers being identified in the following tables as—

Stabilizer A=7-nitroso derivative of 7,14-diazadispiro-[5.1.5.2]-pentadecane-15-thione.
Stabilizer B=14-nitroso derivative of 7,14-diazadispiro-[5.1.5.2]-pentadecane-15-thione.
Stabilizer C=The parent compound of 7,14-diazadispiro-[5.1.5.2]-pentadecane-15-thione.

In the tests 1.25 parts of Stabilizer I per 100 parts of SBR were employed, and for the imidazolidine thione stabilizers only 0.5 part per 100 parts of SBR. The stabilizers were added to the SBR latexes prior to coagulation.

In Table I, the effects of oven aging SBR polymer containing stabilizers of this invention and the commercial stabilizer are compared before and after aging four days in an air circulating oven at 70° C.

TABLE I.—POLYMER STABILIZATION

|  | Surface Rating | | Mooney Viscosity | |
| --- | --- | --- | --- | --- |
|  | Orig. | 4 Days | Orig. | 4 Days |
| Polymer+Stabilizer A | OK | OK | 53.0 | 49.5 |
| Polymer+Stabilizer B | OK | (1) | 52.5 |  |
| Polymer+Stabilizer C | OK | OK | 53.5 | 55.5 |
| Polymer+Stabilizer I | OK | OK | 48.0 | 49.0 |

[1] Resinified.

The foregoing data shows that the 7-nitroso derivative is a good polymer stabilizer, but the 14-nitroso derivative is not a polymer stabilizer.

Table II shows the normal and aged physical properties of vulcanizates obtained from SBR polymer containing Stabilizers A, C and I, respectively, in the different amounts previously described when compounded as indicated in the heading of the table. The various stocks were cured for 30 minutes at 300° F. The table includes Mooney scorch data in which abbreviations are used as follows:

$Vm$=Mooney at minimum viscosity
$Ts(Vm+1)$=Time to start of cure which is the time in minutes required for increase in the Mooney of the stock from minimum viscosity to 1 Mooney unit above minimum viscosity.
$Tc(Vm+10)$=Time to substantial cure which is the time in minutes required for increase in the Mooney of the stock from minimum viscosity to 10 Mooney units above minimum viscosity.

TABLE II

|  | A | I | C |
| --- | --- | --- | --- |
| Polymer+Stabilizer A | 100 |  |  |
| Polymer+Stabilizer I |  | 100 |  |
| Polymer+Stabilizer C |  |  | 100 |
| HAF Black | 50 | 50 | 50 |
| Oil | 8 | 8 | 8 |
| Stearic Acid | 1.5 | 1.5 | 1.5 |
| Zinc Oxide | 3.0 | 3.0 | 3.0 |
| Accelerator | 1.0 | 1.0 | 1.0 |
| Sulfur | 1.75 | 1.75 | 1.7 |
| Total | 165.25 | 165.25 | 165.25 |
| Normal Stress-Strain: |  |  |  |
| 300% Modulus, p.s.i | 2,125 | 2,200 | 2,000 |
| Tensile, p.s.i | 3,200 | 2,250 | 3,050 |
| Elongation, percent | 410 | 410 | 410 |
| Aged 2 Days at 212° F.—Oven: |  |  |  |
| 200% Modulus, p.s.i | 2,525 |  |  |
| Tensile, p.s.i | 2,750 | 2,575 | 2,500 |
| Elongation, percent | 210 | 190 | 190 |
| Aged 5 Hrs. at 260° F.—Air Bomb: |  |  |  |
| 200% Modulus, p.s.i |  |  |  |
| Tensile, p.s.i | 1,100 | 825 | 650 |
| Elongation, percent | 120 | 80 | 70 |
| Mooney Scorch at 275° F.: |  |  |  |
| Ts (Vm+1) | 24.5 | 22.5 | 17.5 |
| Tc (Vm+10) | 29.5 | 30.5 | 22.5 |
| Vm | 19.75 | 19.0 | 20.75 |

The results show that the 7-nitroso derivative has excellent scorch resistance properties compared to the parent compound.

It is to be noted that in the various tests the amount of the commercial stabilizer was 2.5 times that of the stabilizers of this invention.

The examples are illustrative. The amount of stabilizer used will in general be between 0.1 and 10 parts per hundred parts of the polymer or vulcanizate, by weight.

What I claim is:
1. 7 - nitroso-7,14-diazadispiro-[5.1.5.2]-pentadecane-15-thione and lower alkyl derivatives thereof substituted on methylene groups which are connected to two other methylene groups.
2. 7 - nitroso-7,14-diazadispiro-[5.1.5.2]-pentadecane-15-thione.

References Cited by the Examiner
UNITED STATES PATENTS

| 2,806,036 | 9/1957 | Christian | 260—309.7 |
| 2,899,442 | 8/1959 | Hughes | 260—309.7 |
| 2,985,663 | 5/1961 | Cormack et al. | 260—309.7 |
| 2,992,205 | 7/1961 | Broyles et al. | 260—45.8 |
| 3,003,995 | 10/1961 | Schule | 260—45.8 |

WALTER A. MODANCE, *Primary Examiner.*

LEON J. BERCOVITZ, *Examiner.*

M. J. WELSH, N. TROUSOF, *Assistant Examiners.*

UNITED STATES PATENT OFFICE
CERTIFICATE OF CORRECTION

Patent No. 3,275,650                      September 27, 1966

Wendell S. Cook

It is hereby certified that error appears in the above numbered patent requiring correction and that the said Letters Patent should read as corrected below.

In the heading to the printed specification, line 5, for "Fulton, Ohio" read -- Canal Fulton, Ohio --; column 1, line 46, for "2,10-di-t-octyl" read -- 2,10-di-tt-octyl --; line 56, for "2,3,10,11-tetraethyl-17" read -- 2,3,10,11-tetraethyl-7 --; column 4, TABLE II, fourth column, line 9 thereof, for "1.7" read -- 1.75 --.

Signed and sealed this 29th day of August 1967.

(SEAL)
Attest:

ERNEST W. SWIDER                          EDWARD J. BRENNER
Attesting Officer                             Commissioner of Patents